US008285221B2

(12) United States Patent  (10) Patent No.: US 8,285,221 B2
Kundmann et al.  (45) Date of Patent: Oct. 9, 2012

(54) SCALABLE SELF-CALIBRATING AND CONFIGURING RADIO FREQUENCY HEAD FOR A WIRELESS COMMUNICATION SYSTEM

(75) Inventors: Thomas J. Kundmann, Cary, IL (US); Gregory T. Nash, Arlington Heights, IL (US); Aaron W. Netsell, Woodstock, IL (US); Thomas J. Kovarik, Grayslake, IL (US)

(73) Assignee: Motorola Mobility LLC, Libertyville, IL (US)

( * ) Notice: Subject to any disclaimer, the term of this patent is extended or adjusted under 35 U.S.C. 154(b) by 341 days.

(21) Appl. No.: 12/550,432

(22) Filed: Aug. 31, 2009

(65) Prior Publication Data

US 2011/0053646 A1  Mar. 3, 2011

(51) Int. Cl.
 *H04W 24/00* (2009.01)
(52) U.S. Cl. .................... 455/67.14; 455/562.1
(58) Field of Classification Search ............... 455/67.14, 455/562.1
See application file for complete search history.

(56) References Cited

U.S. PATENT DOCUMENTS

| 6,157,343 | A | 12/2000 | Andersson et al. | |
| 2006/0061369 | A1* | 3/2006 | Marks et al. ............ | 324/542 |
| 2009/0075615 | A1 | 3/2009 | Roberts | |
| 2009/0191819 | A1* | 7/2009 | Chae et al. ............... | 455/67.14 |

FOREIGN PATENT DOCUMENTS

| EP | 0713261 B1 | 2/2002 |
| EP | 1335450 B1 | 7/2007 |
| WO | 02078209 A2 | 10/2002 |
| WO | 2007056672 A2 | 5/2007 |

OTHER PUBLICATIONS

Nishimori, Kentaro et al.: "Automatic calibration method of adaptive array for FDD systems", Antennas and Propagation Society International Symposium, 2000, IEEE vol. 2, Jul. 16-21, 2000, pp. 910-913 vol. 2, Digital Object Identifier 10.1109/APS.2000.875367.
Mun Geon Keyong et al.: "Array Calibration for CDMA Smart Antenna Systems", ETRI Journal, vol. 26, No. 6, Dec. 2004, pp. 605-614.
European Patent Office, The Hague, Communication, European Search Report, Dec. 9, 2010, all pages.

* cited by examiner

*Primary Examiner* — Melvin Marcelo (57) ABSTRACT

A method, a system and a device for implementing a scalable, self-calibrating and configuring, radio frequency head in a wireless base station that performs phase calibration for coherent combining of a pair of transmitter outputs. Configurable Antenna Calibration (CAC) logic initiates phase calibration for coherent combining by selecting a first configuration and triggering the transmission of a reference signal by radio frequency (RF) transmitters using different sub-carriers. The CAC logic generates a vector of phase values by comparing the reference signal with the respective signals received by a calibration receiver. The CAC logic also generates calibration coefficients for coherent combining by normalizing the phase values. In addition, a passive combiner mechanism is employed to implement coherent combining. The CAC logic performs calibration of smart antennas by providing calibration coefficients via a second configuration which utilizes both a calibration transmitter and the calibration receiver.

20 Claims, 8 Drawing Sheets

SCALABLE SELF-CALIBRATING AND CONFIGURING RADIO FREQUENCY HEAD FOR A WIRELESS COMMUNICATION SYSTEM

BACKGROUND

1. Technical Field

The present invention generally relates to wireless transmission systems and in particular to calibration of a radio frequency head in wireless transmission systems.

2. Description of the Related Art

Wireless systems regularly broadcast independent radio frequency (RF) signals using smart antenna operation. However, these wireless systems may occasionally combine independent signals before broadcasting the combined signals over the orthogonal frequency division multiple access (OFDMA) air interface. In particular, the wireless system may broadcast independent signals for a particular time interval and broadcast the combined output signals during another time interval. Separate calibration mechanisms are conventionally required for the transmission of independent signals and the transmission of the combined signals. These different calibration mechanisms are generally accommodated by separate sets of dedicated hardware. In addition, the RF components of the transmitter and receiver branches of the different antenna elements usually have different properties.

Thus, in order to support the various deployment options, a number of distinct product variants are generally used to serve multiple markets. As a result, RF Head complexity is increased. Ultimately, costs continue to escalate as wireless base stations integrate support for an increasing set of services.

BRIEF DESCRIPTION OF THE DRAWINGS

The invention itself, as well as advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

The illustrative embodiments provide a method, a system and a device for implementing a configurable antenna calibration facility in a wireless base station to calibrate adaptive antennas and perform phase calibration for coherent combining of a pair of transmitter outputs. Configurable Antenna Calibration (CAC) logic initiates phase calibration for coherent combining by selecting a first configuration and triggering the transmission of a reference signal by radio frequency (RF) transmitters using different sub-carriers. The CAC logic generates a vector of magnitude and phase values by comparing the reference signal with the respective signals received by a calibration receiver. The CAC logic also generates calibration coefficients for coherent combining by normalizing the magnitude and phase values. In addition, a passive combiner mechanism is employed to implement coherent combining. The CAC logic performs calibration of smart antennas by providing calibration coefficients via a second configuration which utilizes both a calibration transmitter and the calibration receiver.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

Within the descriptions of the figures, similar elements are provided similar names and reference numerals as those of the previous figure(s). Where a later figure utilizes the element in a different context or with different functionality, the element is provided a different leading numeral representative of the figure number. The specific numerals assigned to the elements are provided solely to aid in the description and not meant to imply any limitations (structural or functional or otherwise) on the described embodiment.

It is understood that the use of specific component, device and/or parameter names (such as those of the executing utility/logic described herein) are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized.

Figure 1:
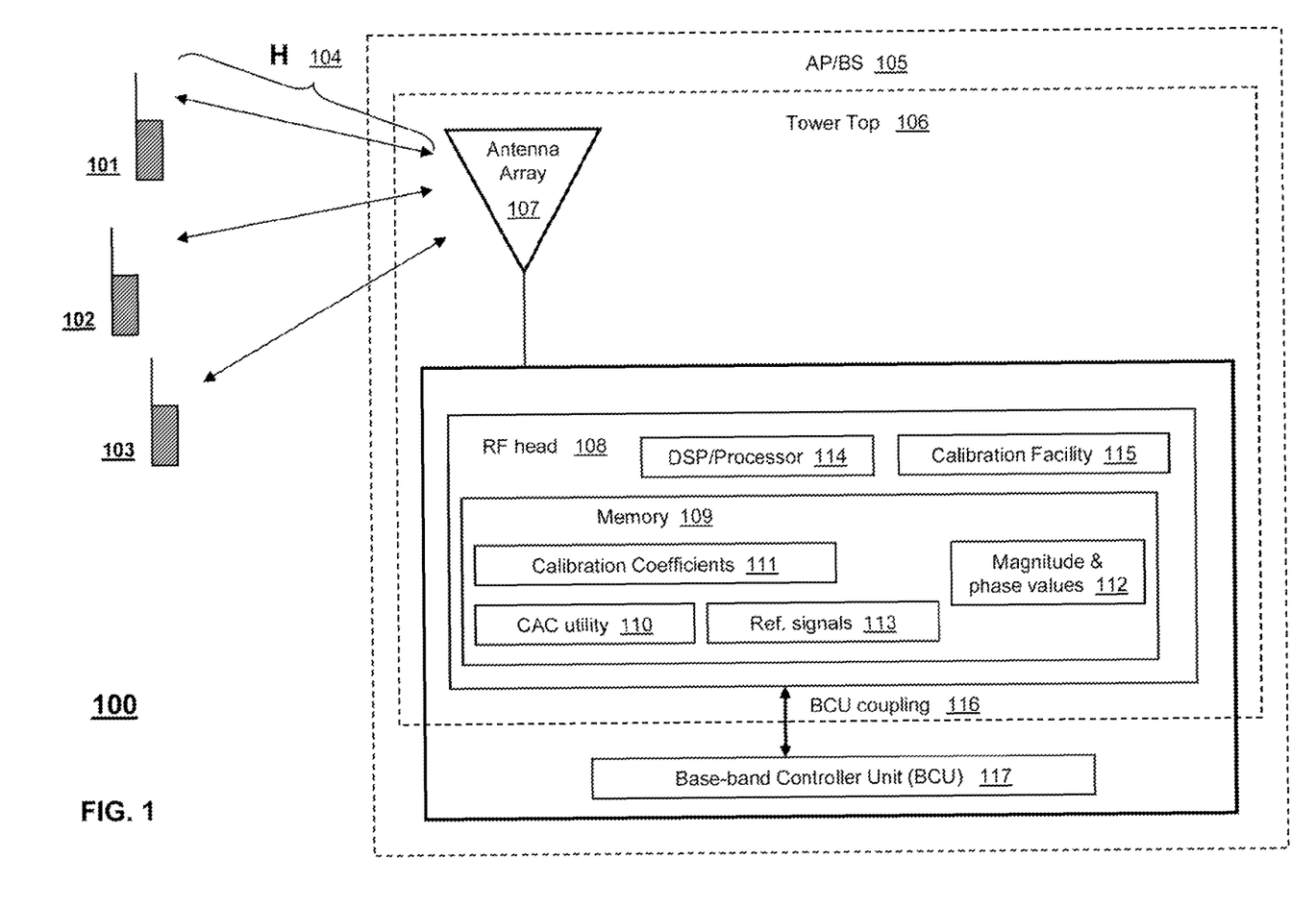
FIG. 1 is a block diagram of an exemplary wireless base station within which the invention is practiced, according to one embodiment.

Referring now to the figures, FIG. 1 is a block diagram of a wireless communication system 100 in accordance with an embodiment of the present invention. Wireless communication system 100 enables the utilization of a common radio frequency head (RF Head) for standards/networks based on, but not limited to, orthogonal frequency division multiplexing (OFDM) technology and, particularly, for fourth generation (4G) networks such as Long Term Evolution (LTE) and Worldwide Interoperability for Microwave Access (WIMAX). Furthermore, the common radio frequency head may be used in multiple configurations to support several desirable deployment options for WIMAX and LTE. Wireless system 100 includes multiple mobile stations (MSs) 101-103 (three shown), for example but not limited to a cellular telephone, a radiotelephone, or a Personal Digital Assistant (PDA), personal computer (PC), or laptop computer equipped for wireless voice communications. In various radio technologies, a mobile station such as MSs 101-103 may be referred to as a user equipment (UE), a subscriber station (SS), an access terminal (AT), or the like.

The multiple MSs 101-103 all connect to a base station 105 via an antenna array 107 that includes multiple antennas. One or more of the MSs may be associated with a mobile user/subscriber. Thus, in certain instances, these MSs may be interchangeably referred to herein as user devices, mobile user devices, or users as a general reference to the association of the device(s) to a device user. These references are however not intended to be limiting on the applicability of the invention to devices not directly associated with individual users. Base station 105 also may be referred to herein as an access point (AP). MSs 101-103 collectively transmit an independent information signal vector (e.g., "s") to base station 105 via a (complex) channel path 'H' of an air interface 104 that connects each of MSs 101-103 to base station 105 via antenna array 107.

BS 105 comprises tower top 106 and base-band controller unit (BCU) 117. Tower top 106 further comprises antenna array 107 and a radio frequency (RF) head device 108 (referred to herein as an "RF head"), which RF head is connected to BCU 117 via coupling 116. Included in RF head 108 is digital signal processor (DSP)/Processsor 114 and an at least one memory device 109, such as random access memory (RAM), dynamic random access memory (DRAM), and/or read only memory (ROM) or equivalents thereof, that is coupled to the processor and that maintains data and programs that may be executed by the associated processor and that allows the base station to perform all functions necessary to operate in communication system 100. RF head 108 also comprises a calibration facility 115.

In addition to the above described hardware components of system 100, various features of the invention are completed/supported via software (or firmware) code or logic stored within the at least one memory device 109 or other storage and executed by DSP/Processor 114. Thus, for example, illustrated within the at least one memory device 109 are a number of software/firmware/logic/data components including configurable antenna calibration (CAC) utility 110. Also illustrated in the at least one memory device 109 are data components, including calibration coefficients 111, reference signals 113 and magnitude and phase values 112. In actual implementation, CAC utility 110 may be combined with calibration facility 115 and reference signals 113 to provide a single executable component, collectively providing the various functions of each individual software/logic component when the corresponding combined component is executed by the DSP/Processor 114. For simplicity, CAC utility 110 is illustrated and described as a stand alone or separate software/firmware/logic component, which provides specific functions, as described below.

Certain functions supported and/or implemented by CAC utility 110 utilize processing logic executed by DSP/processor 114 and/or device hardware to complete the implementation of that function. For simplicity of the description, the collective body of code that enables these various functions is referred to herein as CAC utility 110. Among the software code/instructions/logic provided by CAC utility 110, and which are specific to the invention, are: (a) code/logic for performing antenna calibration associated with multiple levels of base station operation via the configurable antenna calibration facility; (b) code/logic for configuring the configurable antenna calibration facility to perform one or more of: (i) magnitude and phase calibration of adaptive antennas; and (ii) phase calibration of antennas for coherent combining of independent transmitter outputs; and (c) code/logic for enabling effective phase calibration for coherent combining of individual transmitter output signals in a wireless system having a passive combiner mechanism. According to the illustrative embodiment, when DSP/Processor 114 executes CAC utility 110, base station (BS) 105 initiates a series of functional processes that enable the above functional features as well as additional features/functionality. These features/functionality are described in greater detail below.

Those of ordinary skill in the art will appreciate that the hardware components and basic configuration depicted in FIG. 1 and other figures may vary. The illustrative components within wireless communication system 100 are not intended to be exhaustive, but rather are representative to highlight essential components that are utilized to implement the present invention. For example, other devices/components may be used in addition to or in place of the hardware depicted. The depicted example is not meant to imply architectural or other limitations with respect to the presently described embodiments and/or the general invention.

Figure 2:
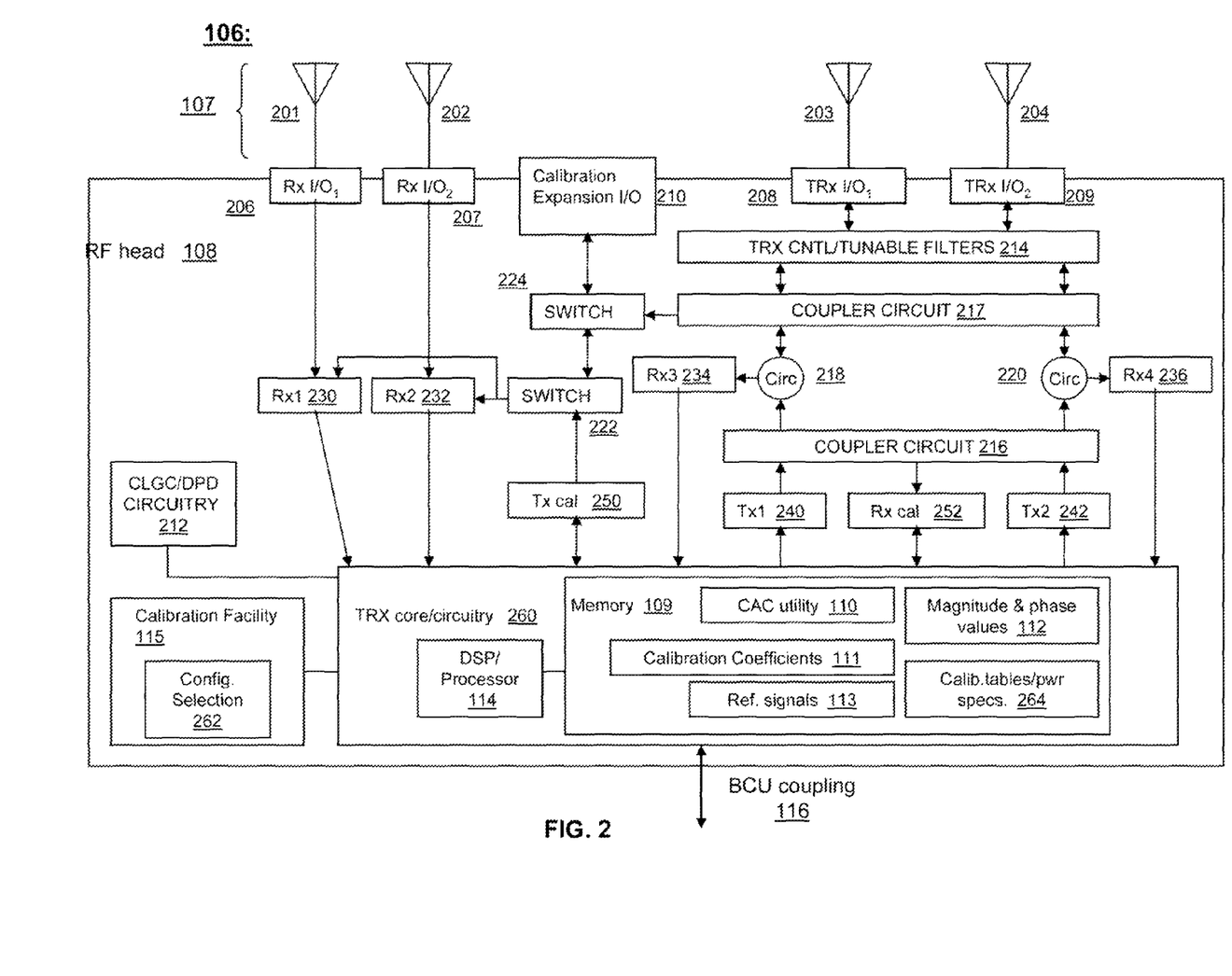
FIG. 2 is a block diagram of the components of the components and circuitry of the radio frequency head of the wireless base station of FIG. 1, according to one embodiment.

Referring now to FIGS. 1 and 2, in wireless communication system 100, the vector of complex signals, "x", conveyed by MSs 101-103 is received by one or more receiver(s), such as receivers 230, 232, 234, and 236, of RF head 108 via the antenna array 107. The signal "x" is received in the k-th subcarrier of the n-th OFDM symbol and is constituted by the superposition of the independently faded signals associated with the L users sharing the same time-frequency resource. Thus, "x" may also be referred to as "x[n;k]". The received signal is corrupted by noise ("n(p)" or "n") at the array elements and, in particular, the received element used for uplink communication. In the forthcoming description, the indices [n; k] have been omitted for notational convenience, yielding the equation 'x=Hs+n.'

The frequency domain channel transfer function matrix 'H' is constituted by the set of channel vectors of the multiple MSs 101-103, each of which hosts the frequency domain channel transfer factors between the single transmitter antenna associated with a particular user/MS, such as MS 101, and the receiver via the antenna array. The frequency domain channel transfer function H(k) of the different users are different channel fading processes.

Similarly, signals transmitted on a downlink by base station 105, for example, by one of multiple transmitters 240, 242 (two shown) of the base station, to MSs 101-103 have components of a downlink channel transfer function as well as noise effects at the transmitter elements. However, configurable antenna calibration (CAC) utility 110 performs antenna calibration via calibration facility 115 to generate calibration coefficients 111. In addition, CAC utility 110 applies calibration coefficients 111 to signals transferred via downlink wireless transmission to compensate for the differences in magnitude and phase between transmitter and receiver pairs in the RF head.

Referring now to FIG. 2, a block diagram is provided of the RF head 108 within the tower top 106 of wireless base station 105 in accordance with an embodiment of the present invention. Tower top 106 comprises radio frequency (RF) head 108 which is coupled to antenna array 107. Also included in Tower top 106 is base-band controller unit (BCU) coupling 116 (e.g., a fiber link), which connects RF head 108 to the base-band controller unit (BCU) 117. Antenna array 107 includes multiple antennas 201-204 (four shown). RF head 108 comprises transceiver (TRX) core circuitry 260 which is coupled to calibration facility 115. RF head 108 further includes multiple radio frequency (RF) receivers 230, 232, 234, 236 (four shown) for receiving signals from MSs 101-103 via air interface 104 and multiple RF transmitters 240, 242 (two shown) for transmitting signals to MSs 101-103 via air interface 104.

A first receiver (Rx1) 230 of the multiple RF receivers 230, 232, 234, 236 is coupled to a first receive antenna 201 of the multiple antennas 201-204 of antenna array 107 via a first receiver input/output port (Rx I/O$_1$) 206 of multiple receiver input/output ports 206, 207 (two shown) of RF head 108. A second receiver (Rx2) 232 of the multiple RF receivers 230, 232, 234, 236 is coupled to a second receive antenna 202 of the multiple antennas 201-204 of antenna array 107 via a second receiver input/output port (Rx I/O$_2$) 207 of multiple receiver input/output ports 206, 207 of RF head 108. A third receiver (Rx3) 234 of the multiple RF receivers 230, 232, 234, 236 is coupled to a first transmitter/receiver, or transceiver, antenna 203 of the multiple antennas 201-204 of antenna array 107 via (moving from the antenna to the receiver) a first transmitter/receiver input/output port (TRx I/O$_1$) 208 of multiple transmitter/receiver input/output ports 208, 209 (two shown), tunable filters 214, a second coupler circuit 217, such as a circuit comprising multiple directional couplers, and a first circulator 218 of RF head 108. And a fourth receiver (Rx4) 236 of the multiple RF receivers 230, 232, 234, 236 is coupled to a second transmitter/receiver, or transceiver, antenna 204 of the multiple antennas 201-204 of antenna array 107 via (moving from the antenna to the receiver) a second transmitter/receiver input/output port (TRx I/O$_2$) 209 of multiple transmitter/receiver input/output ports 208, 209, the tunable filters 214, the second coupler circuit 217, and a second circulator 220 of RF head 108. The path between each RF receiver 230, 232, 234, 236 and a corresponding antenna of antenna array 107, or at least between the RF receiver and a corresponding input/output port of the multiple input/output ports 206-210 via which the receiver receives a signal from air interface 104, may be referred to herein as a 'receiver path' or a 'receiver branch' of base station 105 and/or RF head 108. Similarly, the path between each RF transmitter 240, 242 and a corresponding antenna of antenna array 107, or at least between the RF transmitter and a corresponding input/output port of the multiple input/output ports 206-210 via which the transmitter conveys a signal to air interface 104, may be referred to herein as a 'transmitter path' or a 'transmitter branch' of base station 105 and/or RF head 108.

A first transmitter (Tx1) 240 of the multiple RF transmitters 240, 242 is coupled to the first transmitter/receiver, or transceiver, antenna 203 of the multiple antennas 201-204 of antenna array 107 via (moving from the transmitter to the antenna) a first coupler circuit 216, such as a circuit comprising multiple directional couplers, the first circulator 218, the second coupler circuit 217, the tunable filters 214, and the first transmitter/receiver input/output port (TRx I/O$_1$) 208. And a second transmitter (Tx1) 242 of the multiple RF transmitters 240, 242 is coupled to the second transmitter/receiver, or transceiver, antenna 204 of the multiple antennas 201-204 of antenna array 107 via (moving from the transmitter to the antenna) the first coupler circuit 216, the second circulator 220, the second coupler circuit 217, the tunable filters 214, and the second transmitter/receiver input/output port (TRx I/O$_2$) 209.

As antennas 201 and 202 and Rx I/Os 206 and 207 are herein coupled only to RF receivers, that is, RF receivers 230 and 232, respectively, and therefore are used herein to receive signals from air interface 104, they are referred to herein as receive antennas and receiver input/output ports. And as antennas 203 and 204 and input/output ports 208 and 209 herein are coupled to both RF receivers and RF transmitters, that is, to RF receivers 234 and 236 and RF transmitters 240 and 242, and herein are used to both receive signals from air interface 104 and to transmit signals over the air interface, they are referred to herein as transmitter/receiver antennas and transmitter/receiver input/output ports. First circulator 218 routes inbound signals received at first transmitter/receiver input/output port 208 to third RF receiver 234 and routes outbound signals transmitted by first RF transmitter 240 to transmitter/receiver input/output port 208. Similarly, second circulator 220 routes inbound signals received at second transmitter/receiver input/output port 209 to fourth RF receiver 236 and routes outbound signals transmitted by second RF transmitter 242 to transmitter/receiver input/output port 209.

TRX core circuitry 260 comprises DSP/Processor 114, which is coupled to the at least one memory device 109. The at least one memory device 109 maintains the calibration coefficients 111 and reference signals 113, calibration tables/power specifications 264, magnitude and phase values 112, and the configurable antenna calibration (CAC) utility 110. In one embodiment, the at least one memory device 109 and/or some components of the at least one memory device (e.g., calibration coefficients 111 and reference signals 113) may actually be located within BCU 117 or within memory located within BCU 117. Calibration facility 115 comprises a calibration transmitter (Tx cal) 250 and a calibration receiver (Rx cal) 252 (although, for illustrative purposes, Tx cal 250 and Rx cal 252 are shown outside of calibration facility 115 in FIG. 2). Calibration facility 115 further includes configuration selection facility/sub-circuitry 262. The processor 114 and at least one memory device 109 also are coupled to a collection of power and noise control sub-circuitry 212. Power and noise control sub-circuitry 212 includes a closed loop gain control (CLGC) sub-circuit and a digital pre-distorter (DPD) sub-circuit. The processor 114 and at least one memory device 109 also are coupled to TRX controller/Tunable Filters 214, which controls the input/output of signals via the multiple transceiver input/output ports 208, 209.

Calibration receiver 252 is a receiver dedicated to performing a calibration of transmit branches of RF head 108, that is, of RF transmitters 240 and 242, by receiving a calibration reference signal that is sourced by the RF transmitters and is coupled to calibration receiver 252 via the first coupler circuitry 216.

Calibration transmitter 250 is a transmitter dedicated to performing a calibration of receive branches of RF head 108, that is, of RF receivers 230, 232, 234, and 236. Calibration transmitter 250 sources a calibration reference signal to each of first and second RF receivers 230, 232 via a first switching circuit 222. First switching circuit 222 is coupled to each of the calibration transmitter and the RF receivers and provides for a routing of signals among the calibration transmitter and RF receivers. Calibration transmitter 250 also sources the calibration reference signal to third RF receiver 234 via the first switching circuit 222, a second switching circuit 224 coupled to the first switching circuit, the second coupler circuit 217 (which is coupled to the second switching circuit 224), and the first circulator 218. Similarly, calibration transmitter 250 sources the calibration reference signal to fourth RF receiver 236 via the first switching circuit 222, the second switching circuit 224, the second coupler circuit 217, and second circulator 220. However, in another embodiment of the present invention, one of the multiple RF transmitters 240, 242 may source a calibration reference signal to each of the RF receivers 234 and 236 via first coupler circuitry 216 and circulators 218 and 220, respectively, and may source the calibration reference signal to each of the RF receivers 230 and 232 via the first coupler circuit 216, the first circulator 218, the second coupler circuit 217, the second switching circuit 224, and the first switching circuit 222. Each switching circuit 222, 224 is coupled to, and controlled by, processor 114 and comprises one or more switches that facilitate a routing of signals to and from the multiple components of RF head 108 that are coupled to the switching circuit.

RF head 108 further includes a calibration expansion input/output port 210 that is coupled to calibration transmitter 250 via switching circuit 224 and switching circuit 222. The calibration expansion input/output port 210 facilitates the RF head 108 providing a calibration signal, sourced by calibration transmitter 250, to another RF head for use in calibrating the receive branches of the another RF head. The calibration expansion input/output port 210 also facilitates the RF head 108 receiving a calibration signal from another RF head, sourced by a calibration transmitter of the another RF head, for use in calibrating the receive branches of the RF head 108. Thus the calibration expansion input/output port 210 facilitates a sharing of a calibration transmitter, such as calibration transmitter 250, among multiple RF heads, eliminating a need for a calibration transmitter in each such RF head and thereby reducing RF head costs.

Diversity Access Point (DAP) is a Broadband Time Division Duplexing (TDD) Access Point system that incorporates high transmitter output power and adaptive antenna options. In wireless system 100, Configurable Antenna Calibration (CAC) utility 110 configures calibration facility 115 via configuration selection facility 262 to perform Transmit Adaptive Antenna (TxAA) calibration. Calibration facility 115 comprises sub-circuitry specific to the various configurations and calibration selection sub-circuitry (e.g., configuration selection facility 262) to enable selection and corresponding signal access to circuit paths specific to the respective configurations.

Transmit Adaptive Antenna (TxAA) calibration is a process by which differences in transmitter and receiver paths for each transceiver (TRX), that is, for pairs of transmitters and receivers, are factored into the calibration process in the digital domain. An adaptive antenna is a type of smart antenna. The adaptive antenna is referred to as "smart" because the adaptive antenna improves on the traditional antenna by adjusting for traffic patterns, as well as end user location (beamforming) and interference rejection (null steering) at a given time to increase signal strength and quality. To adjust for frequency and channel use and to adaptively shape antenna patterns, the adaptive antenna uses multiple antennas. Transmit Antenna calibration (TxA) may be used herein to refer to a more general form of antenna calibration which may not involve adaptive/smart antennas.

For example, TxA calibration may involve antennas which are used to transmit combined RF signals as a single high power output. CAC utility 110 triggers TxAA calibration to ensure that differences in magnitude and phase between a first TRX path and a second TRX path are accounted for when performing "beam forming," "beam shaping," or "null steering". As a result, signals from multiple RF transmitters, such as RF transmitters 240 and 242, can be coherently and intelligently combined (over the air) to enable "beam forming" or "null steering". CAC utility 110 initiates antenna calibration for various levels of operation via multiple configurations, respectively. Depending on the configuration selected by CAC utility 110, antenna calibration may employ calibration transmitter 250, which is a dedicated and separate transmitter from the multiple radio frequency (RF) transmitters 240, 242. In addition, the calibration process may utilize dedicated calibration receiver 252 in various configurations. However, the functionality provided/described herein is also applicable to TxAA calibration processes that do not require cal transmitter or cal receiver functionality.

CAC utility 110 initiates the TxAA calibration process by initiating a receive branch calibration process. CAC utility 110 triggers calibration transmitter 250 (or one of the RF transmitters 240, 242) to transmit a known sequence comprising one or more symbols (e.g., reference signal 113). The common known signal is coupled into each of the multiple RF receivers 230, 232, 234, 236. Each of the multiple RF receivers 230, 232, 234, 236 demodulates the received calibration signal and, following demodulation of the signals by the multiple receivers 230, 232, 234, 236, magnitude and phase values of the received symbols for each receive branch, that is, for each of the multiple RF receivers 230, 232, 234, 236, are determined by TRX core/circuitry 260, and more particularly by processor 114, and stored as magnitude and phase values 112.

CAC utility 110 also initiates a transmit branch calibration process by triggering each of the RF multiple transmitters 240, 242 to transmit a known/reference sequence, comprising one or more symbols, using different sub-carriers. CAC utility 110 may initiate simultaneous signal transmissions or sequential signal transmissions from the multiple RF transmitters 240, 242. Power and noise control sub-circuitry 212, which includes a closed loop gain control (CLGC) sub-circuit and a digital pre-distorter (DPD) sub-circuit, provides (a) amplitude adjustment based on preamble signal power and (b) compensation for RF power amplifier distortion. The sequences transmitted by each RF transmitter 240, 242 in the transmit branch calibration process are coupled into calibration receiver 252. The calibration receiver 252 detects the signals and demodulates the detected signals. TRX core/circuitry 260, and more particularly the processor 114, compares each detected and demodulated signal with the transmitted known/reference sequence to determine a second set of magnitude and phase values of the known symbols associated with each RF transmitter 240, 222, which determined second set of magnitude and phase values also are stored as magnitude and phase values 112.

The recorded magnitude and phase values associated with each of the multiple RF transmitters 240, 242 are divided by the recorded magnitudes and phases associated with each of the multiple RF receivers 230, 232, 234, 236 to produce a vector of TRX magnitude and phase deltas. However, this vector also contains noise effects from this calibration transmitter/receiver (TRX) process. As these noise effects are common to all of the symbols, CAC utility 110 normalizes this vector relative to the first element in the vector. Thus, a first TRX element (that is, a first element of the vector, which element is associated with an RF transmitter/RF receiver pair) has TxAA cal coefficients of 0 dB and 0 phase. By normalizing the elements of the vector, the noise effects from the calibration process are removed. The remaining calibration coefficients are the delta magnitude and phase of each calibration TRX, relative to the first calibration TRX coefficients. The use of the first calibration TRX, as the basis for normalizing the other calibration TRXs, is arbitrary. In one embodiment, CAC utility 110 may utilize some repetition and averaging procedure to remove the effects of short-term magnitude and phase errors (e.g., the effects due to local oscillator (LO) phase noise).

The smart antenna system uses received signals on each antenna to estimate the channel and "weights" the signals to each transmitter accordingly in order to "shape the beam" back to the mobile. However, the weights on the transmitted signals may be adjusted by the TxAA/TxA calibration coefficients determined as described above to account for the differences in the magnitude and phase of each RF transmitter/RF receiver pair in BS 105.

In another embodiment of the present invention, calibration facility 115 may provide a configuration process that just calibrates transmit paths associated with the RF transmitters 240, 222 (that is, a TxA calibration process) to minimize transmitter-only magnitude and phase values/deltas (i.e., as opposed to both transmitter and receiver deltas as discussed above). As a result, CAC utility 110 may employ a subset of the TxAA calibration process (i.e., a modified TxAA/TxA calibration process). In addition, CAC utility 110 may utilize additional logic or firmware code via calibration facility 115. This modified process uses a receiver, preferably calibration receiver 252 although any of the RF receivers 230, 232, 234, 236 may be used, to measure magnitude and phase differences between the multiple RF transmitters 240, 242 only, normalized to one of the RF transmitters. This process may also be repeated at regular time intervals, just as is done for the TxAA calibration process. Transmitter only calibration is described in FIG. 3.

Figure 3:
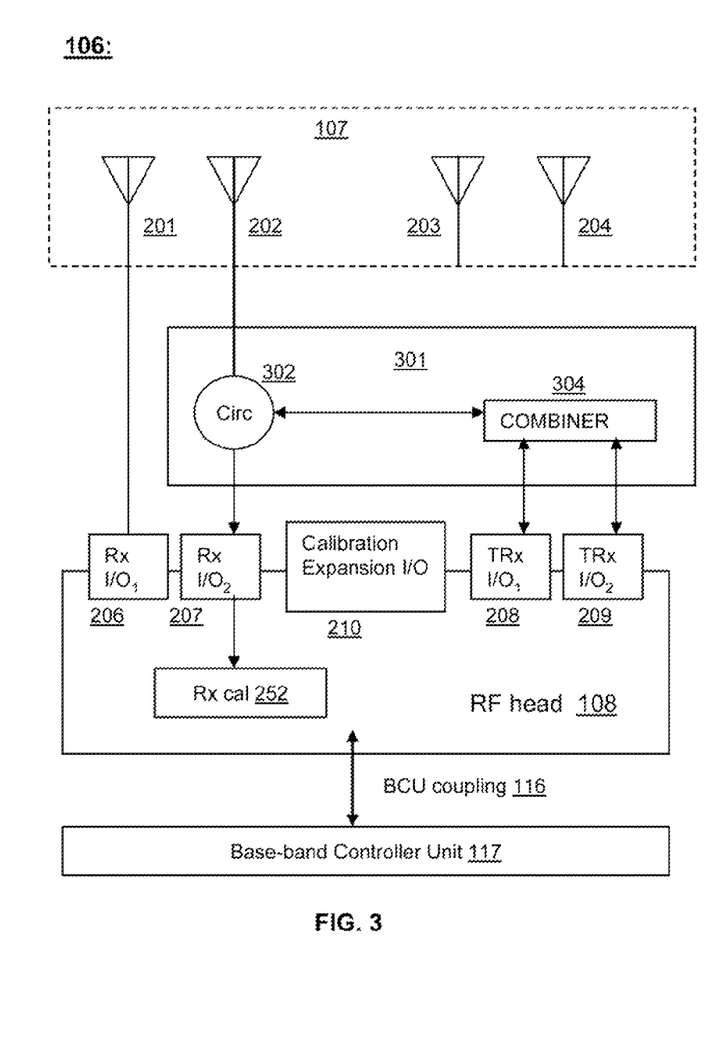
FIG. 3 is a block diagram of a tower top of a wireless base station configured for coherent output combining, according to one embodiment.

FIG. 3 is a block diagram representation of the radio frequency head 108 within the tower top 106 of wireless base station 105 according to another embodiment of the present invention. Tower top 106 comprises radio frequency (RF) head 108 which is coupled to antenna array 107. However, in addition to the components described with respect to FIG. 2, tower top 106 as depicted in FIG. 3 also comprises a passive combiner circuit 301 comprising a combiner 304 coupled to a circulator 302. Combiner 304 is coupled to each of transmitter/receiver input/output ports 208 and 209, and thereby to RF transmitters 240, 242, and circulator 302 is coupled to receive input/output port 207 and to antenna 202. However, in this embodiment of the RF head 108, calibration receiver 252 also is coupled to receive input/output port 207, optionally via one or more of switching circuits 222 and 224.

Combiner 304 combines signals output by each of the multiple RF transmitters 240, 242 into a single output signal, preferably utilizing passive components (e.g., resistors, capacitors, inductors, etc), that then is routed to calibration receiver 252 via circulator 302 and receive input/output port 207 As a result, combiner circuit 301 supports the time division duplex (TDD) Long Term Evolution (LTE) standards by combining individual transmitter output signals into a single output signal and is less expensive and ensures greater stability and linearity when compared with active combiners. Consequently, combiner circuit 301 results in a power combining scheme that does not require extensive factory calibrations. Combiner circuit 301 is a component of a circuit path that is accessible via calibration facility 115/configuration selection facility 262. RF head 108 provides output combining by using passive combiner 301 with no feedback mechanism to the TRX. Configurable Antenna Calibration (CAC) utility 110 configures calibration facility 115 to perform calibration in order to enable the coherent combining of multiple signals into a single output signal. A system configured for coherent output combining is not likely to use smart/adaptive antennas. Furthermore, weighting transmitters to minimize transmit-only error results in different weights than weighting transmitters to minimize both transmitter (Tx) and receiver (Rx) path differences, as is carried out for smart/adaptive antennas. However, in one embodiment, CAC utility 110 may employ a combination of antenna calibration for smart antenna systems and coherent combining systems, within the same wireless base station.

CAC utility 110 initiates TxA calibration by triggering each of the multiple RF transmitters 240, 242 to transmit a known signal. Power and noise control sub-circuitry 212, which includes a closed loop gain control (CLGC) sub-circuit and a digital pre-distorter (DPD) sub-circuit, respectively provides (a) amplitude adjustment based on preamble signal power and (b) compensation for RF power amplifier distortion. The calibration receiver 252 receives each transmitted signal and normalizes the magnitude and phase of each received signal by reference to one of the received signals, as described above, appropriately adjusting the phase of each sub-carrier based on the received signal used as a reference signal for normalization purposes. This TxA calibration is carried out using/controlling the magnitude and phase for several sub-carriers across the channel, and is repeated if the transmitter changes channels.

Figure 4:
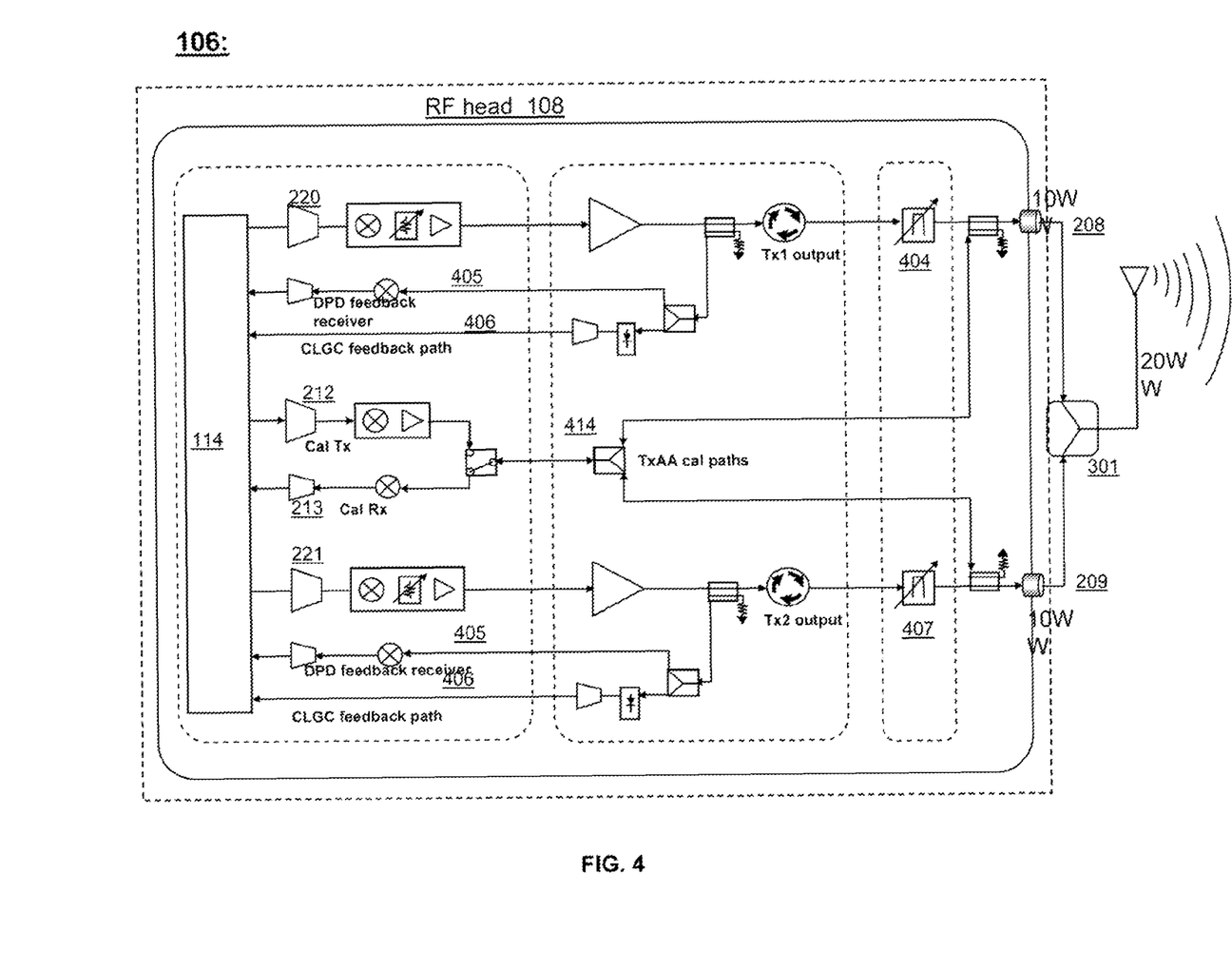
FIG. 4 is a schematic diagram of a closed loop gain control (CLGC) feedback path and a digital pre-distortion (DPD) loop in the radio frequency head of the tower top of FIG. 1 configured for coherent output combining, according to one embodiment.

FIG. 4 is a schematic diagram of a CLGC feedback path and a digital pre-distorter (DPD) loop of RF head 108 of tower top 106 according to an embodiment of the present invention. As depicted in FIG. 4, tower top 106 comprises RF head 108 and combiner 301. RF head 108 comprises an example Diversity Access Point (DAP) transmitter pair (receivers not explicitly shown) illustrated by first Tx1 240 and second Tx2 242. RF head 108 also comprises a DPD control loop/receiver(s) 405 and a CLGC feedback path 406 in association with each RF transmitter 240, 242. Additionally, RF head 108 comprises a directional coupler/coupling path 414, calibration Tx block 250 and calibration Rx block 252. Also included in RF head 108 is DSP/Processor 114. In addition, RF Head 108 comprises tunable transmit filters including first Tx filter 404 and second Tx filter 407.

The magnitude and phase calibration for coherent combining is enabled by coupling the combiner 301 to a point located just prior to N-type connectors of the multiple TRX outputs (e.g., TrX3 208 and TrX4 209). Consequently, magnitude and phase calibration impacts the phase of each transmitter right at the transmitter output of RF Head 108. As a result, post-coupler magnitude and phase errors are avoided or minimized.

When CAC utility 110 initiates magnitude and phase calibration for coherent output combining, a CLGC feedback path 406 associated with each RF transmitter 240, 242 measures a power of the reference signal output by each transmitter 240, 242. Transmitter output power is measured by observing a signal power level of a preamble symbol output by the transmitter using a preamble detector (not shown) included in the RF head 108. The preamble detector includes a log-detector circuit that detects a signal power level of the preamble symbol and an analog to digital converter (ADC) that quantifies the detected signal power level. CAC utility 110 then compares the quantified signal power level output by the ADC to a detector calibration target value. Thus, when the preamble detector output is equal to the target value, the transmitter signal power substantially provides the transmission of all symbols at full rated power during a corresponding transmitter data burst.

The preamble symbol magnitude detected by each CLGC feedback path 406 is not affected by the magnitude or phase of the data symbols. Therefore, if TxA calibration makes adjustments to some or all the data symbols of a first RF transmitter, e.g., Tx1 240, in order to normalize the first transmitter to the magnitude and/or phase of another RF transmitter, e.g., Tx2 242, the preamble symbols of each RF transmitter are not affected. CLGC feedback path 406 continues to monitor the preamble symbols and acts to keep the power level of the preambles equal to the target detector calibration value.

A Digital Pre-distortion (DPD) loop/receiver(s) 405 associated with each RF transmitter 240, 242 corrects for RF power amplifier (PA) distortion introduced by the corresponding transmitter. DPD control loop/receiver 405 detects and demodulates the signals output by the corresponding RF transmitter, compares the detected and demodulated signal to an ideal signal, and applies correction to predistort signals input into the corresponding RF transmitter so that after introduction of the PA distortion, the transmitter output more closely matches the ideal signal. Thus, on each RF transmitter path, the spectral regrowth (spectral mask) from PA distortion is reduced significantly and in-band distortion is minimized. Individual transmitter signals pass spectral mask and wideband noise specifications, especially when a channel filter is used. When the signals output by two RF transmitters, such as transmitters 240 and 242, of RF head 108, each with independent lineups and DPD loops 405, are coherently combined outside of DPD loops 405, the carrier to noise ratio does not degrade and may indicate measurable improvement. Diversity Access Point (DAP) RF transmitter lineups are uncorrelated, since these RF transmitter branches/lineups have separate local oscillators (LOs) and separate gains stages. Thus, the noises of each transmitter branch do not add coherently, during signal combining, to provide any substantial noise gain since these noises are uncorrelated.

Given the absolute output power accuracy performance of CLGC feedback path 406 and the expected level of power obtained when individual transmitter signals are combined, further amplitude adjustments by antenna calibration provides no significant impact. Furthermore, power adjustments by CLGC feedback path 406 and DPD control loop 405 substantially provide the required magnitude alignment for coherent combining. In addition, phase adjustments provide a substantially greater impact to combined output power than do magnitude adjustments.

As a result, CAC utility 110 executes antenna calibration for coherent combining without depending exclusively upon the specific configuration of components in an RF head to adjust for differences in power/amplitude between RF transmitters in the RF head. In one embodiment, CAC utility 110 allows the individual power control mechanisms (e.g., CLGC feedback path 406 and DPD control loop/receiver 405) associated with each RF transmitter to substantially control the amplitude of each transmitter branch. In another embodiment, CAC utility 110 allows the individual power control mechanisms and the antenna calibration procedure to share in controlling the amplitude of each transmitter branch. Also, while the differences in magnitude tend to be less consequential than the differences in phase, the functionality associated with the use of the TxA calibration process described herein is not precluded to normalize for amplitude differences.

CAC utility 110 provides a configuration that exclusively performs phase calibration of transmitters by comparing the ideal phase of symbols/sub-carriers of the reference signals with the actual phase of the symbols/sub-carriers for each transmitter. CAC utility 110 does not obtain absolute phase impact from any transmitter because the phase impact of the calibration receiver is included. However, CAC utility 110 obtains the difference between one transmitter's phase and the phase of another transmitter (i.e., the relative phase impact/value of a transmitter from the phase perspective of a particular other transmitter). A transmitter's relative phase impact may be used to adjust the respective phase of individual sub-carriers to match the phase of another transmitter. During phase calibration of transmitters, CAC utility 110 generates calibration coefficients by normalizing relative phase values of corresponding transmitters to the phase values of a selected transmitter.

As described above, the RF head 108 may use power detector sub-circuitry to provide further accuracy to the coherent combining and an associated antenna calibration. The power detector facility may be used with a phase and/or amplitude imbalance calibration configuration to minimize combining errors due to phase and/or amplitude imbalance of the transmitters. Thus, CAC utility 110 may perform antenna calibration by a particular configuration implemented/facilitated mostly by software and/or firmware code.

Figure 5:
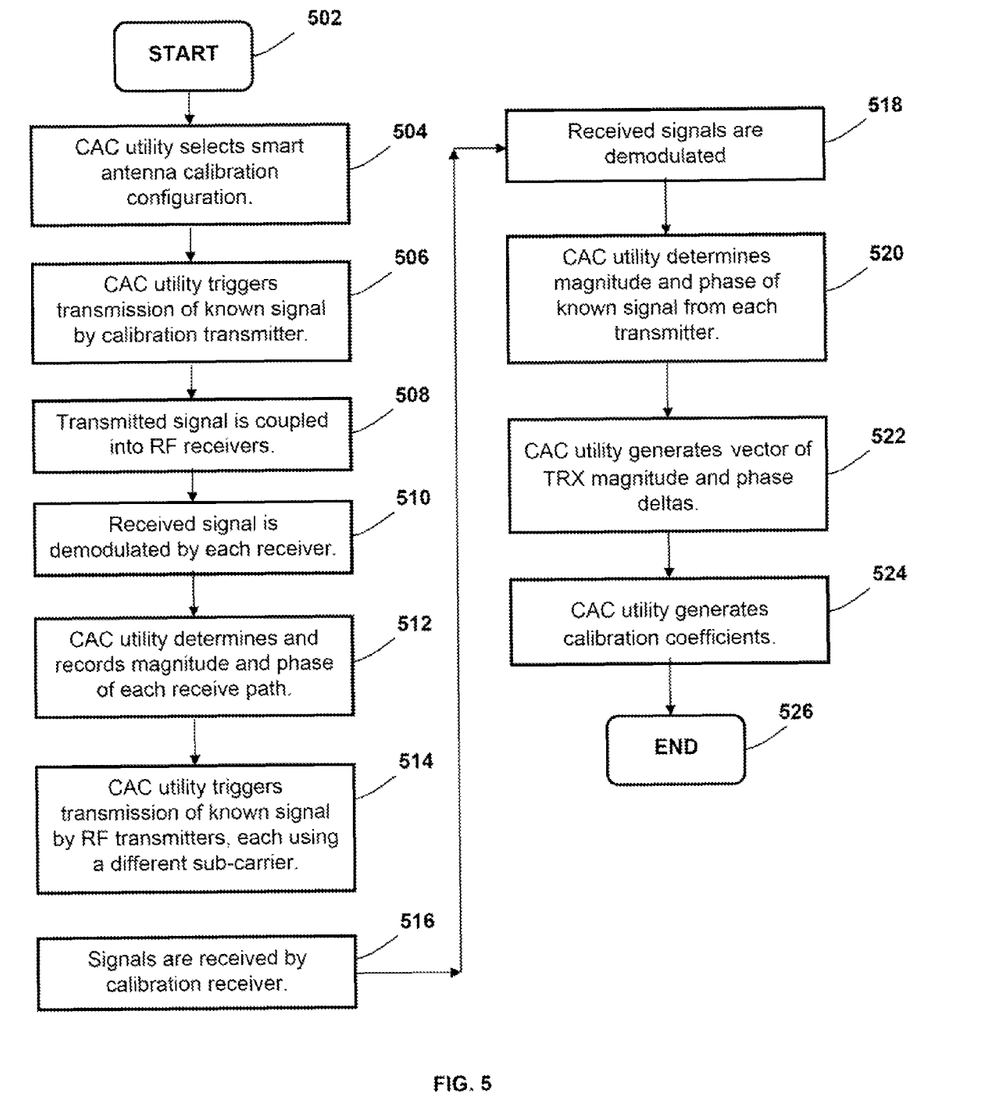
FIG. 5 is a flow chart illustrating the process of performing a transmitter adaptive antenna (TxAA) calibration, according to one embodiment.
Figure 6:
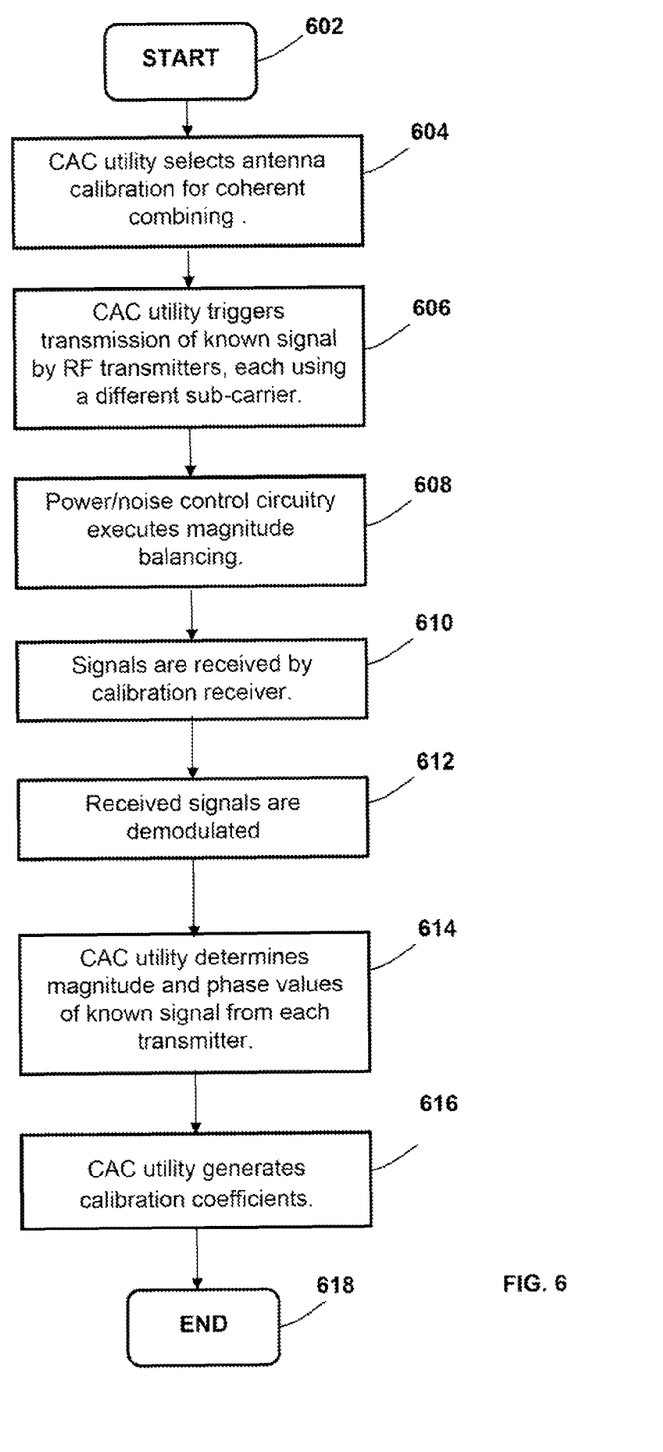
FIG. 6 is a flow chart illustrating the process of performing a transmitter antenna (TxA) calibration for coherent output combining, according to one embodiment.

FIGS. 5 and 6 are flow charts illustrating methods by which the above processes of the illustrative embodiments are performed by wireless base station 105, and in particular RF head 108. In particular, FIG. 5 illustrates the process of performing a transmitter adaptive antenna (TxAA) calibration in accordance with an embodiment of the present invention. Although the methods illustrated in FIGS. 5 and 6 are described with reference to components shown in FIGS. 1-4, it should be understood that this is merely for convenience and alternative components and/or configurations thereof can be employed when implementing the various methods. Key portions of the methods may be completed by CAC utility 110 executing on DSP/processor 114 within RF Head 108 (FIG. 1) and controlling specific operations of/on RF Head 108, and the methods are thus described from the perspective of either/both CAC utility 110 and RF Head 108.

The process of FIG. 5 begins at initiator block 502 and proceeds to block 504, at which Configurable Antenna Calibration (CAC) utility 110 selects a calibration configuration. At block 506, CAC utility 110 triggers the transmission of a first reference signal by the TxAA calibration transmitter 250. At block 508, the signal is received by (i.e., coupled into) the multiple RF receivers 230, 232. At block 510, each received signal is demodulated by the corresponding RF receiver. Based on the respectively received signals, CAC utility 110 determines and records, for each RF receiver 230, 232, the magnitude and phase of the received symbols, as shown at block 512. CAC utility 110 triggers the transmission of a second reference signal by each of the multiple RF transmitters 240, 242, each using a different sub-carrier, as shown at block 514. At block 516, the TxAA calibration receiver 252 receives the transmitted signals and, at block 518, demodulates the received signals. At block 520, CAC utility 110 determines the magnitude and phase of the known symbols from each RF transmitter 240, 242 by comparing the received signals to the second reference signal.

At block 522, CAC utility 110 obtains a vector of TRX magnitude and phase deltas by dividing the magnitude and phase of the symbols of the RF transmitters, as received by calibration receiver 252, by the magnitudes and phases of the symbols received by/corresponding to the RF receivers 230, 232. CAC utility 110 obtains the calibration coefficients by normalizing the vector of TRX magnitude and phase deltas to remove magnitude and phase effects from the calibration process/transceivers, as shown at block 524.

When CAC utility 110 and the smart/adaptive antenna system uses received signals from mobile users/wireless communication devices on each antenna to estimate the mobile channel, CAC utility 110 obtains a first set of weights which are ultimately used to perform "beam shaping" or "beam forming" from each respective RF transmitter 230, 232 back to the mobile user/wireless communication device. CAC utility 110 obtains an enhanced set of beam shaping weights by adjusting the first set of weights by the TxAA calibration coefficients to account for the differences in the magnitude and phase of each RF receiver/RF transmitter pair in base station 105. CAC utility 110 applies the enhanced set of beam shaping weights to the signals to each RF transmitter accordingly, to shape the beam back to the mobile. The process illustrated by the flow chart of FIG. 5 ends at block 526.

The flow chart of FIG. 6 illustrates the process of performing a transmitter antenna (TxA) calibration for coherent output combining in accordance with an embodiment of the present invention. The process of FIG. 6 begins at initiator block 602 and proceeds to block 604, at which Configurable Antenna Calibration (CAC) utility 110 selects a configuration to perform TxA calibration for coherent output combining. At block 606, CAC utility 110 triggers the transmission of a reference signal by the multiple RF transmitters 240, 242, each using a different sub-carrier. At block 608, the Power/Noise control circuitry performs magnitude balancing. The transmitted signals are received by the calibration receiver 252, as shown at block 610. At block 612, the calibration receiver 252 demodulates the received signals. At block 614, CAC utility 110 determines a magnitude and phase value for the detected signal/symbols from each RF transmitter 240, 242 by comparing the received symbols/signals to the reference signal.

CAC utility 110 obtains the calibration coefficients by normalizing the vector of transmitter (Tx) magnitude and phase values to remove phase effects from the calibration process/transceivers, as shown at block 616. The process illustrated by the flow chart of FIG. 6 ends at block 618.

The described embodiments provide, in a radio frequency (RF) head of the wireless base station, CAC logic that: automatically selects a calibration configuration for performing antenna calibration from among: (a) a first configuration for magnitude and phase calibration of adaptive antennas; and (b) a second configuration for magnitude and phase calibration of antennas utilized with coherent combining of independent transmitter outputs. The CAC logic generates calibration coefficients via the calibration configuration selected. When the second configuration is selected, the CAC logic provides effective phase calibration for coherent combining of individual transmitter output signals with a passive combiner mechanism, which passive combiner mechanism is coupled to the RF head. The CAC logic controls the amplitude of a transmitter signal within the RF head via an individual power control mechanism.

In addition, the CAC logic enables null-steering and beam shaping, that is, beam forming, via the adaptive antennas when the first configuration is selected. Null-steering and beam shaping enables transmission of high power output signals in the direction of a receiving device. The CAC logic also enables null-steering and beam shaping to occur via antennas utilized with coherent combining by using corresponding calibration coefficients when the second configuration is selected.

Figure 7:
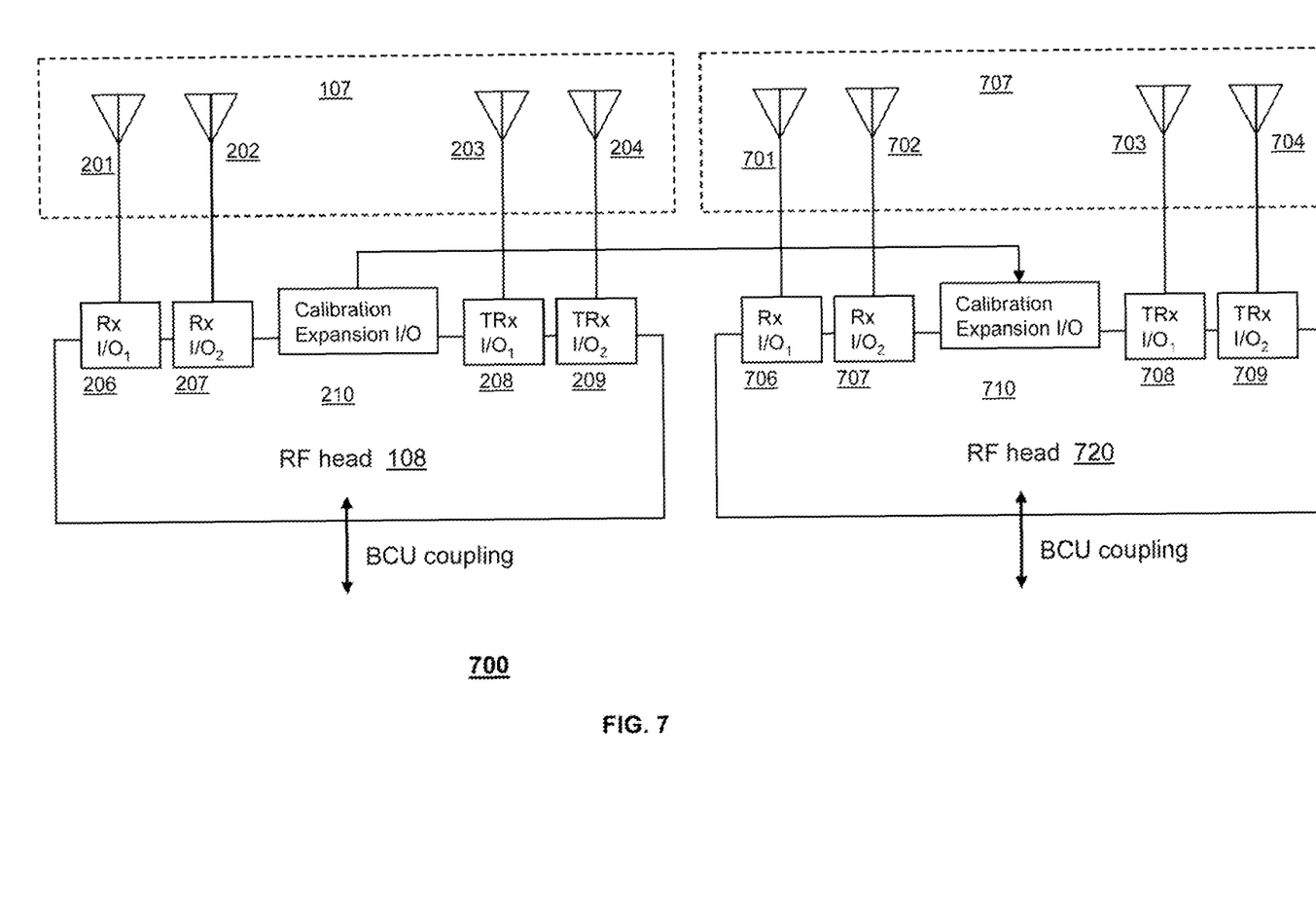
FIG. 7 is a block diagram of a wireless communication system that illustrates a scalability of a radio frequency head in accordance with an embodiment of the present invention.

As noted above, RF head 108 includes a calibration expansion input/output port 210 that facilitates the RF head 108 providing a calibration signal, sourced by calibration transmitter 250, to another RF head for use in calibrating the receive branches of the another RF head and that further facilitates RF head 108 receiving a calibration signal from another RF head, sourced by a calibration transmitter of the another RF head, for use in calibrating the receive branches of the RF head 108. Referring now to FIG. 7, a block diagram is provided of a wireless communication system 700 that illustrates a scalability of RF head 108 in accordance with an embodiment of the present invention. FIG. 7 depicts two RF heads, that is, a first RF head (RF head 108, as described above), and a second RF head 720. RF head 720 has the same components as RF head 108, including first and second receiver input/output ports 706, 707, first and second transmitter/receiver input/output ports 708, 709, and a calibration expansion input/output port 710. However, RF head 720 may or may not include a calibration transmitter.

That is, RF head 720 is coupled to RF head 108 via the calibration expansion input/output port 210 of RF head 108 and the calibration expansion input/output port 710 of RF head 720. Thus the calibration expansion input/output port 710 a calibration reference signal from calibration transmitter 250 of RF head 108 via the calibration expansion input/output ports 210 and 710. RF head 720 then may use the calibration reference signal received from calibration transmitter 250 to calibrate each of the multiple RF receivers of RF head 720 (corresponding to RF receivers 230, 232, 234, and 236 of RF head 108). While only two RF heads 108, 720 are depicted in FIG. 7, one of ordinary skill in the art realizes that any number of RF heads may be coupled to RF head 108 via their respective calibration expansion input/output ports, allowing for RF head 108, and in particular calibration transmitter 250, to serve as a calibration reference signal source for each such RF head. Thus the scalable nature of the RF head depicted herein can produce cost savings by reducing a need for a calibration transmitter in each and every RF head.

Figure 8:
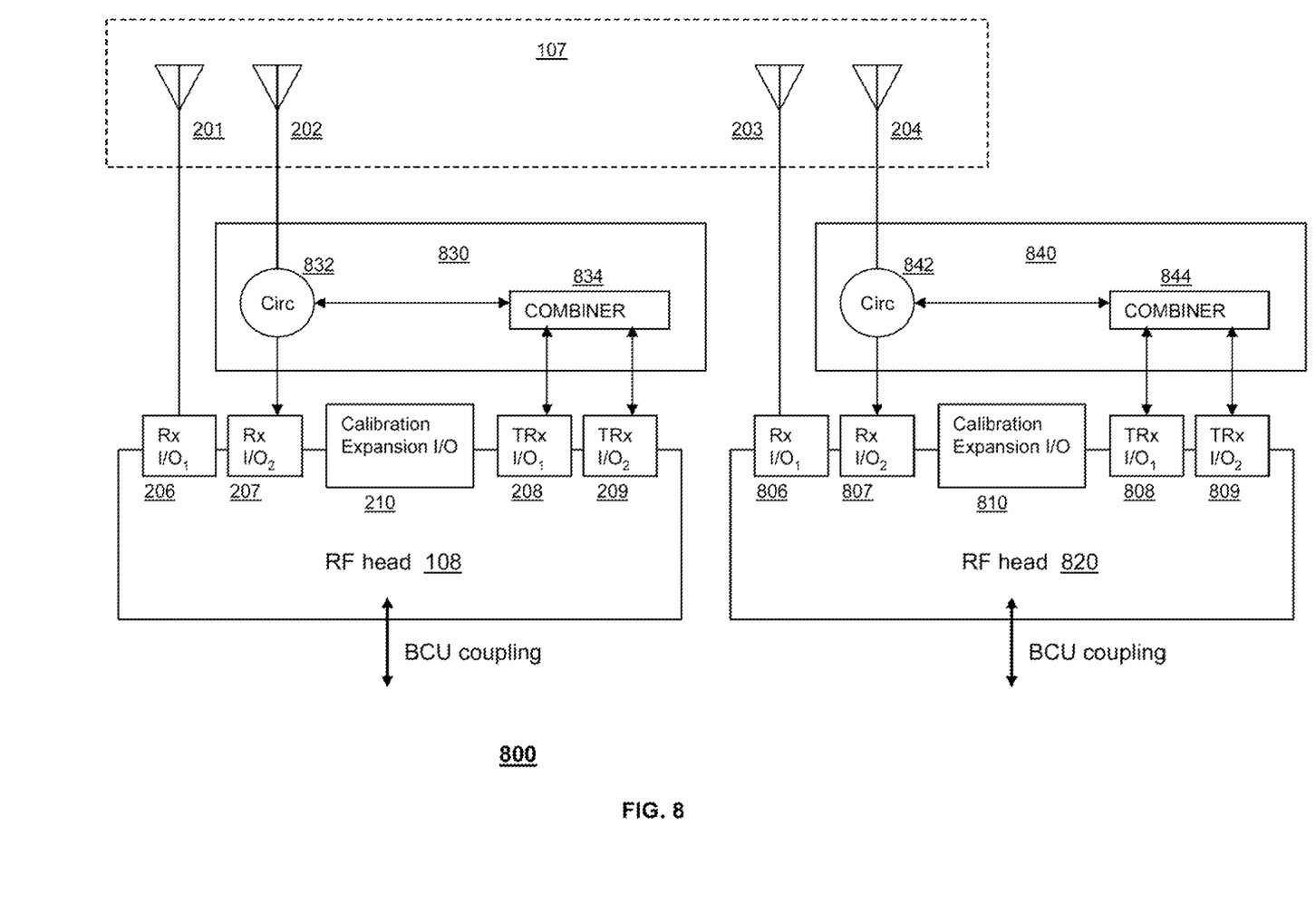
FIG. 8 is a block diagram of a wireless communication system that illustrates a scalability of a radio frequency head in accordance with another embodiment of the present invention.

Referring now to FIG. 8, a block diagram is provided of a wireless communication system 800 that illustrates a scalability of RF head 108 in accordance with another embodiment of the present invention. FIG. 8 depicts two RF heads, that is, a first RF head (RF head 108, as described above), and a second RF head 820. RF head 820 has the same components as RF head 108, including first and second receiver input/output ports 806, 807, first and second transmitter/receiver input/output ports 808, 809, and a calibration expansion input/output port 810. In addition, each of RF head 108 and RF head 280 is coupled to a respective passive combiner circuit 830, 840. Each combiner circuit 830, 840 comprises a respective combiner 834, 844 coupled to a respective circulator 832, 842. Each of combiners 834, 844 is coupled to the transmitter/receiver input/output ports of their respective RF head 108, 820 and combines signals received from those input/output ports. That is, combiner 834 is coupled to the first and second transmitter/receiver input/output ports 208, 209 of RF head 108 and combiner 844 is coupled to the first and second transmitter/receiver input/output ports 808, 809 of RF head 820. Each of circulators 832 and 842 is coupled to a respective combiner 834, 844 and to a receiver input/output port of their respective RF head 108, 820. For example, as depicted in FIG. 8, circulator 832 is coupled to receiver input/output port 207 and circulator 832 is coupled to receiver input/output port 807. Each combiner 830, 840 is further coupled to an antenna 202, 204 of antenna array 107 via their respective combiners 832, 842, thus allowing for signals received at the multiple transmitter/receiver input/output ports of each RF head to be combined and routed to a single antenna. Thus not only does communication system 800 provide the calibration benefits facilitated by use of the combiner circuits as described above with respect to FIG. 3, but communication system 800 further provides for a non-overlapping sharing of the antennas of antenna array 107 by multiple RF heads.

In the flow charts above, one or more of the methods may be embodied in a computer readable medium containing computer readable code such that a series of steps are performed when the computer readable code is executed (by a processing unit) on a computing device. In some implementations, certain processes of the methods are combined, performed simultaneously or in a different order, or perhaps omitted, without deviating from the spirit and scope of the invention. Thus, while the method processes are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

As will be appreciated by one skilled in the art, the present invention may be embodied as a method, system, and/or device. Accordingly, the present invention may take the form of an entirely hardware embodiment, an entirely software embodiment (including firmware, resident software, microcode, etc.) or an embodiment combining software and hardware aspects that may all generally be referred to herein as a "circuit," "module," "logic", or "system."

As will be further appreciated, the processes in embodiments of the present invention may be implemented using any combination of software, firmware, microcode, or hardware. As a preparatory step to practicing the invention in software, the programming code (whether software or firmware) will typically be stored in one or more machine readable storage mediums such as fixed (hard) drives, diskettes, magnetic disks, optical disks, magnetic tape, semiconductor memories such as RAMs, ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The medium may be electronic, magnetic, optical, electromagnetic, infrared, or semiconductor system (or apparatus or device) or a propagation medium. Further, the medium may be any apparatus that may contain, store, communicate, propagate, or transport the program for use by or in connection with the execution system, apparatus, or device. The methods of the invention may be practiced by combining one or more machine-readable storage devices containing the code according to the described embodiment(s) with appropriate processing hardware to execute the code contained therein. An apparatus for practicing the invention could be one or more processing devices and storage systems containing or having network access (via servers) to program(s) coded in accordance with the invention. In general, the term computer, computer system, or data processing system can be broadly defined to encompass any device having a processor (or processing unit) which executes instructions/code from a memory medium.

Thus, it is important that while an illustrative embodiment of the present invention is described in the context of a fully functional wireless communication system with installed (or executed) software, those skilled in the art will appreciate that the software aspects of an illustrative embodiment of the present invention are capable of being distributed as an article of manufacture comprising executable code recorded on or distributed via one or more forms of media.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for configuring a wireless base station having a configurable antenna calibration facility, the method comprising:
   in a radio frequency (RF) head of the wireless base station, automatically selecting a calibration configuration for performing antenna calibration from among: (a) a first configuration for magnitude and phase calibration of adaptive antennas; and (b) a second configuration for magnitude and phase calibration of antennas utilized with coherent combining of independent transmitter outputs;
   generating calibration coefficients via the calibration configuration selected;
   when the second configuration is selected, providing effective phase calibration for coherent combining of individual transmitter output signals with a passive combiner mechanism, wherein the passive combiner mechanism is coupled to the RF head;
   controlling an amplitude of a transmitter signal within the RF head via an individual power control mechanism; and
   when the first configuration is selected, enabling null-steering and beam shaping via the adaptive antennas, wherein the null-steering and beam shaping enables transmission of output signals in a direction of a receiving device, enabling null-steering and beam shaping of adaptive antennas utilized with coherent combining by using corresponding calibration coefficients when the second configuration is selected.

2. The method of claim 1, further comprising, when the first configuration for magnitude and phase calibration of adaptive antennas is selected:
   transmitting a first reference signal by a calibration transmitter;
   detecting the first reference signal by a plurality of RF receivers;
   demodulating respective first received signals at corresponding RF receivers;
   obtaining a first set of magnitude and phase values from respective first received signals, wherein the first received signals correspond to respective receiver paths of corresponding RF receivers;
   recording the first set of magnitude and phase values;
   initiating transmission of a second reference sequence by RF transmitters;
   receiving the second reference signals via the calibration receiver; and
   demodulating the second reference signals received.

3. The method of claim 2, further comprising, when the second configuration for magnitude and phase calibration of antennas for coherent combining of independent transmitter outputs is selected:
   initiating transmission of reference calibration sequences by RF transmitters;
   receiving calibration sequences via the calibration receiver;
   demodulating the received calibration sequences;
   determining a first set of transmitter magnitude and phase values by comparing the received calibration sequences with respective reference calibration sequences, wherein the received calibration sequences correspond to respective transmitter paths of corresponding RF transmitters;

generating a vector of normalized transmitter magnitude and phase values; and wherein the normalized transmitter magnitude and phase values are obtained via normalization operations relative to magnitude and phase values of a selected RF transmitter, the normalization operations include phase adjustment of respective sub-carriers.

4. The method of claim 2, further comprising, when the first configuration for magnitude and phase calibration of adaptive antennas is selected:

determining a second set of transmitter magnitude and phase values by comparing the second received signals with respective second reference signals, wherein the second received signals correspond to respective transmitter paths of corresponding RF transmitters;

obtaining a vector of TRX magnitude and phase deltas from a mathematical division of the second set of transmitter magnitude and phase values by the first set of receiver magnitude and phase values; and generating a vector of normalized transceiver (TRX) magnitude deltas and phase deltas;

wherein the generating minimizes a noise impact resulting from TRX calibration; and wherein the normalized transceiver (TRX) magnitude deltas and phase deltas are obtained via normalization operations relative to magnitude and phase values of a selected TRX.

5. The method of claim 2, wherein initiating comprises:

triggering one of (a) substantially simultaneous transmissions of a second reference signal from respective RF transmitters, or (b) sequential transmissions of the second reference signal from respective RF transmitters; and applying distinct sub carriers for respective transmissions of reference signals by corresponding RF transmitters.

6. The method of claim 1, wherein enabling effective phase calibration comprises:

activating a passive combiner circuitry, wherein the passive combiner circuitry is positioned external to an RF head and outside a calibration circuitry; and when an antenna calibration configuration is selected, performing one of (a) coupling the passive combiner circuitry to the RF head or (b) bypassing the passive combiner circuitry.

7. The method of claim 1, further comprising:

controlling an amplitude of a transmitter signal within the RF head via an individual power control mechanism, the mechanism includes one or more of: (a) a closed loop gain control (CLGC) circuit; and (b) the digital pre-distorter (DPD) control loop;

minimizing an impact of short term magnitude and phase errors by using a repetition and averaging procedure in a generation of calibration coefficients; and performing phase matching of transmitter signals provided as inputs to the combiner mechanism by using phase matched input leads to the combiner, the phase matched input cables having identical physical dimensions.

8. A radio frequency (RF) head device for use in a wireless base station comprising:

a calibration facility;

processing logic and circuitry in the calibration facility that is configured to:

automatically select a calibration configuration for performing antenna calibration from among: (a) a first configuration for magnitude and phase calibration of adaptive antennas; and (b) a second configuration for magnitude and phase calibration of antennas utilized with coherent combining of independent transmitter outputs;

generate calibration coefficients via the calibration configuration selected;

when the second configuration is selected, providing effective phase calibration for coherent combining of individual transmitter output signals with a passive combiner mechanism, wherein the passive combiner mechanism is coupled to the RF head;

control an amplitude of a transmitter signal within the RF head via an individual power control mechanism; and when the first configuration is selected, enable null-steering and beam shaping via the adaptive antennas wherein the null-steering and beam shaping enables transmission of output signals in a direction of a receiving device, and enabled null-steering and beam shaping of adaptive antennas utilized with coherent combining by using corresponding calibration coefficients when the second configuration is selected.

9. The RF head device of claim 8, wherein the processing logic and circuitry in the calibration facility is configured to, when the first configuration for magnitude and phase calibration of adaptive antennas is selected:

transmit a first reference signal by a calibration transmitter;

detect the first reference signal by a plurality of RF receivers;

demodulate respective first received signals at corresponding RF receivers;

obtain a first set of magnitude and phase values from respective first received signals, wherein the first received signals correspond to respective receiver paths of corresponding RF receivers;

record the first set of magnitude and phase values;

initiate transmission of a second reference sequence by RF transmitters;

receive the second reference signals via the calibration receiver; and demodulate the second reference signals received.

10. The RF head device of claim 9, wherein the processing logic and circuitry in the calibration facility is configured to, when the second configuration for magnitude and phase calibration of antennas for coherent combining of independent transmitter outputs is selected:

initiate transmission of reference calibration sequences by RF transmitters;

receive calibration sequences via the calibration receiver;

demodulate the received calibration sequences;

determine a first set of transmitter magnitude and phase values by comparing the received calibration sequences with respective reference calibration sequences, wherein the received calibration sequences correspond to respective transmitter paths of corresponding RF transmitters; and generate a vector of normalized transmitter magnitude and phase values;

wherein the normalized transmitter magnitude and phase values are obtained via normalization operations relative to magnitude and phase values of a selected RF transmitter, the normalization operations include phase adjustment of respective sub-carriers.

11. The RF head device of claim 9, wherein the processing logic and circuitry in the calibration facility is configured to, when the first configuration for magnitude and phase calibration of adaptive antennas is selected:

determine a second set of transmitter magnitude and phase values by comparing the second received signals with respective second reference signals, wherein the second received signals correspond to respective transmitter paths of corresponding RF transmitters;

obtain a vector of TRX magnitude and phase deltas from a mathematical division of the second set of transmitter magnitude and phase values by the first set of receiver magnitude and phase values; and generate a vector of normalized transceiver (TRX) magnitude deltas and phase deltas, wherein the generating minimizes a noise impact resulting from TRX calibration; and wherein the normalized transceiver (TRX) magnitude deltas and phase deltas are obtained via normalization operations relative to magnitude and phase values of a selected TRX.

12. The RF head device of claim 9, wherein the processing logic and circuitry in the calibration facility is configured to initiate transmission of a second reference sequence by RF transmitters by:

triggering one of (a) substantially simultaneous transmissions of a second reference signal from respective RF transmitters, or (b) sequential transmissions of the second reference signal from respective RF transmitters; and applying distinct sub carriers for respective transmissions of reference signals by corresponding RF transmitters.

13. The RF head device of claim 8, wherein the processing logic and circuitry in the calibration facility is configured to enable effective phase calibration by:

activating a passive combiner circuitry, wherein the passive combiner circuitry is positioned external to an RF head and outside a calibration circuitry;

when an antenna calibration configuration is selected, performing one of (a) coupling the passive combiner circuitry to the RF head or (b) bypassing the passive combiner circuitry;

controlling an amplitude of a transmitter signal within the RF head via an individual power control mechanism, the mechanism includes one or more of: (a) the closed loop gain control (CLGC) circuit; and (b) the digital pre-distorter (DPD) control loop;

minimizing an impact of short term magnitude and phase errors by using a repetition and averaging procedure in a generation of calibration coefficients; and performing phase matching of transmitter signals provided as inputs to the combiner mechanism by using phase matched input leads to the combiner, the phase matched input cables having identical physical dimensions.

14. The RF head device of claim 8, further comprising a power control mechanism having one or more of: (a) a CLGC feedback loop; and (b) a DPD control loop.

15. The RF head device of claim 8, further comprising a plurality of input/output ports, wherein an input/output port of the plurality of input/output ports is a calibration expansion input/output port for coupling the RF head device to a calibration expansion input/output port of another RF head device.

16. The RF head device of claim 15, further comprising a plurality of RF receivers and wherein at least one RF receiver of the plurality of RF receivers performs a calibration of a corresponding receiver branch by receiving a calibration reference signal from the calibration expansion input/output port of the RF head device.

17. A wireless base station comprising the RF head device of claim 8.

18. The wireless base station of claim 17, wherein the RF head device comprises a plurality of input/output ports and wherein the wireless base station comprises a passive combiner coupled to the RF head device via the plurality of input/output ports.

19. A wireless communication system comprising:

a first radio frequency (RF) head device comprising:
a plurality of input/output ports, wherein an input/output port of the plurality of input/output ports is a calibration expansion input/output port; and
a calibration transmitter capable of coupling to the calibration expansion input/output port and that sources a calibration reference signal;

a second RF head device comprising a plurality of input/output ports, wherein an input/output port of the plurality of input/output ports is a calibration expansion input/output port; and wherein the calibration expansion input/output port of the first RF head device is coupled to the calibration expansion input/output port of the second RF head device and wherein the calibration transmitter of the first RF head device sources the calibration reference signal to the second RF head device via the calibration expansion input/output ports of the first RF head device and the second RF head device.

20. The wireless communication system of claim 19, wherein the second RF head device comprises a plurality of RF receivers and wherein the second RF head device calibrates a receive branch associated with each RF receiver of the plurality of RF receivers based on the calibration reference signal sourced by the calibration transmitter of the first RF head device.

* * * * *